United States Patent Office 3,069,728
Patented Dec. 25, 1962

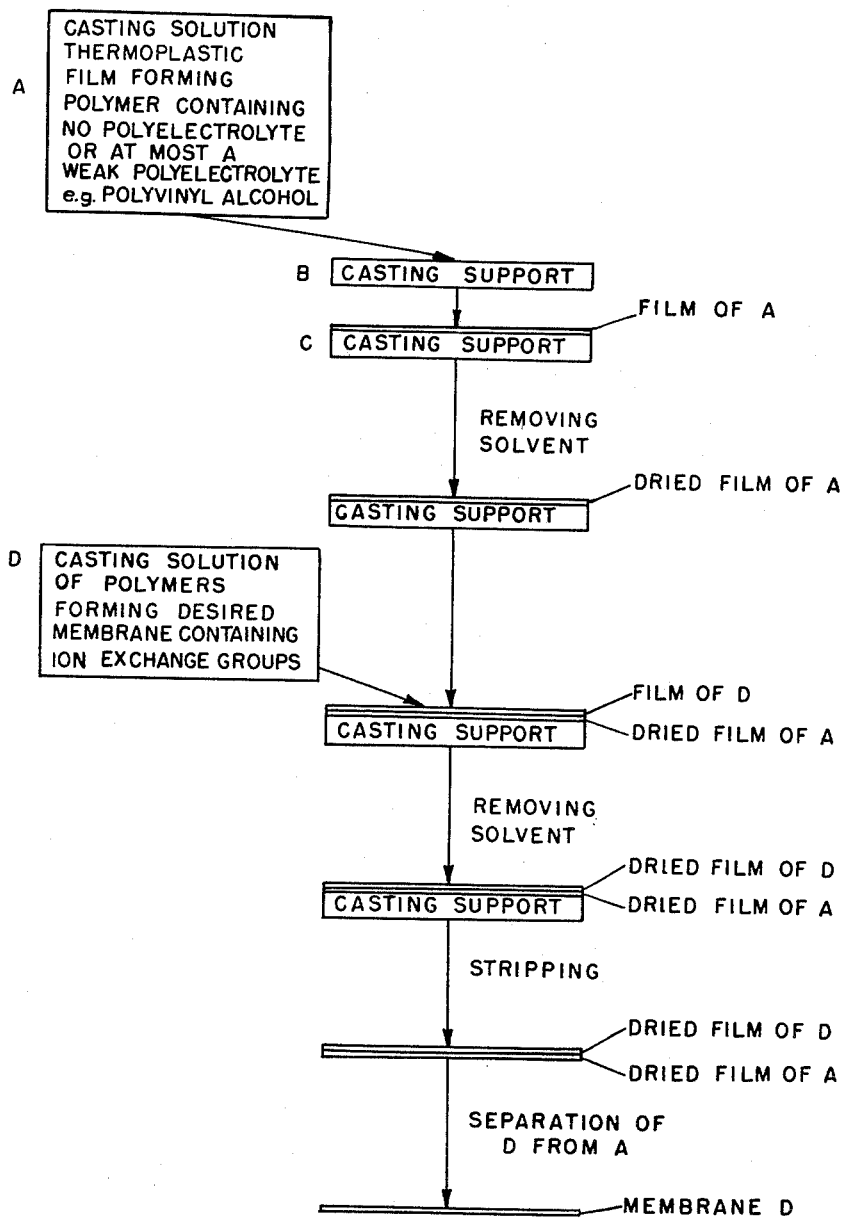

3,069,728
PRODUCTION OF ION SELECTIVE
PERMEABLE MEMBRANE
Morris Mindick and Harold I. Patzelt, Chicago, Ill., assignors to National Aluminate Corp., Chicago, Ill., a corporation of Delaware
Filed July 22, 1957, Ser. No. 673,104
5 Claims. (Cl. 18—57)

This invention relates to the production of ion selective permeable membranes and to a new method for casting articles having ion exchange properties, particularly, ion exchange membranes or the like. More particularly, the invention relates to the large-scale production of electronegative and electropositive ion selective barriers having high permselectivities and low ohmic resistances.

In patent application Serial No. 511,062, filed May 25, 1955, now matured into U.S. Patent 3,004,904, and in patent application Serial No. 513,944, filed June 8, 1955, now matured into U.S. Patent 3,004,909, both by Gregor and Patzelt, new and very useful electronegative and electropositive selective permeable membranes having high permselectivities and low ohmic resistances are described. The present invention relates to improvements in the production of such membranes which provide considerable advantages in the commercial production of the membranes.

The membranes are produced by casting an organic solvent solution of the polymers which make up the membranes on a suitable base or support, and then removing solvent from the cast layer by evaporation. In producing smaller quantities of the membranes, they are contacted after evaporation of the solvent, with a polar liquid which also serves to loosen the membrane and permits its removal from the support. In producing larger quantities of the membranes, it is necessary that the solution be cast, dried and removed from the support rapidly, after which the treatment with a polar liquid may be conducted for the desired, often relatively long, time while not interfering with the rapid production of the membranes. It was found, however, that the membranes adhere tenaciously to the casting support, especially to a stainless steel belt or plates which are employed in commercial film casting. In order to operate satisfactorily, it is necessary that the membranes be mechanically removed or pulled off of the support, with no necessary for soaking or other procedures designed to loosen the adherence of the membrane.

It has now been discovered in accordance with the invention that the problem of removing the membranes from the support can be overcome by casting a film of the polymers forming the membrane, on a film of a thermoplastic film-forming polymer, and separating the films. A film of a solvent-resistant thermoplastic film-forming polymer is first cast on a suitable support, preferably a stainless steel surface, and then a solution of the membrane polymers is cast on the film. The solvent is removed from the layer by evaporation, to produce the membrane on the film. The membrane is readily separated from the film.

The general procedure involved in carrying out the process is illustrated in the accompanying drawing. As shown in the drawing, this procedure comprises casting a solvent solution of a thermoplastic, film-forming polymer containing no polyelectrolyte, or at most a weak polyelectrolyte (e.g., polyvinyl alcohol), on a metal surface in a thin layer, removing solvent from said layer to produce a film of said polymer, casting the homogenous molecular dispersion in a solvent of a water insoluble acid and alkali-resistant thermoplastic film-forming polymer, and a linear polyelectrolyte on said film in a thin layer, said homogeneous molecular dispersion preferably containing 40% to 90% by weight of said water insoluble acid and alkali-resistant thermoplastic film-forming polymer and 10% to 60% by weight of said linear polyelectrolyte, removing solvent from said last named layer to produce a membrane on said film, removing the resultant laminated film and membrane as a unit from said metal surface, and separating said membrane from said film.

While the invention is not limited to any theory, it appears that the polyelectrolyte in the membrane is responsible for the tenacity of adherence of the membrane to the support upon which it is cast. By first casting a film of a polymer which is at most a weak electrolyte, having low polarity, or is substantially a non-electrolyte as compared with the ion exchange membranes, the problem of adhesion to the support is overcome. It is also found that the adhesion of the film to the membrane is not so great as to interfere with the separation of the two.

The invention applies generally to the various solvent solutions from which the membranes may be cast. However, it is preferred that the polymers forming the membranes be cast from a butyrolactone solution, as described in our co-pending application, Serial No. 673,105, filed July 22, 1957, now matured into U.S. Patent 2,957,206. This method results in the production of membranes having improved electrochemical properties, increased strength, and increased thickness, and in a number of other advantages.

The ion exchange membranes produced according to the invention are either cation exchange or electronegative membranes, or anion exchange or electropositive membranes. They constitute finely porous films of homogeneous molecular dispersions of film-forming polymers and polyelectrolytes. The walls of the pores of the membranes carry dissociable groups. The groups may be acidic, such as sulfonic, phosphonic or carboxylic groups, in the case of the cation exchange or electronegative membranes, or basic, such as onium groups, e.g., quaternary ammonium groups, in the case of the anion exchange or electropositive membranes. The dissociable groups are an integral part of the membrane structure. The cation exchange membranes adsorb cations thereon, or exchange cations for those originally present on the membranes. These membranes also pass cations therethrough to the exclusion of anions, that is, they are permselective, when appropriate ion concentrations are maintained on the opposite sides of the membrane. The anion exchange membranes function in like manner, exchanging anions on the membrane.

The membranes are preferably cast intimate mixtures of the film-forming polymer and the polyelectrolyte, being cast from a solution thereof and thus producing a homogeneous molecular dispersion of the materials, which is distinct from the type of mixture obtained when a solid substance is dispersed in another material. The cast film is preferably treated with a polar liquid after formation of the film. The polyelectrolyte has a minimum average molecular weight of about 5000.

In a preferred form, the membrane is an intimate mixture of a water-insoluble substantially linear polyvinyl-type thermoplastic film-forming resin and a water-soluble linear polyvinyl type polyelectrolyte, in the form of a thin finely porous film. The polymers are at most insubstantially cross-linked, and contain not exceeding two percent cross-linking agent, by weight of the polymer. The amount of permissible cross-linking varies with the polymer. The ability to form a film, in particular, from an organic solvent solution of the polymers, is a necessary characteristic in the invention. The infusible, insoluble substances which are for the most part brittle and tend to crack upon drying are not suitable for use in the invention.

The polyvinyl-type polymers are those derived by the addition polymerization of at least one monoolefinic compound through the unsaturated aliphatic group. They are preferably addition polymers of the unsymmetrically substituted ethylene class, comprising polymers obtained by polymerization or copolymerization of monomers containing a

group, such as vinyl halides, vinylidene halides, vinyl esters, styrenes and acrylics.

The plastic film-forming materials used in making the membranes may be of several types both as regards their chemical structure and their physical properties. The plastic film-forming material should be capable of being cast into a thin homogeneous film from an organic solvent casting solution. This film should be chemically stable, resistant to acids and alkalies, and water insoluble, in order to provide ultimately a satisfactory composite membrane film. The film-forming material must also be compatible when dissolved or dispersed in a casting solution with the polyelectrolyte which is incorporated therewith at the time the membrane is cast.

The most useful type of film-forming plastic materials are those derived from the copolymerization of vinyl chloride and acrylonitrile. These polymers may range from between 45% and 80% by weight of vinyl chloride, preferably, between 60% and 80% vinyl chloride, the balance being acrylonitrile. Their specific viscosities at 20° C. are preferably from 0.2 to 0.6 (0.1 gram in 50 cc. acetonyl acetone). Such polymers are described in U.S. Patent 2,420,565. A typical polymer of this type is a commercial material sold under the trade name Dynel. This material contains a major portion of vinyl chloride and a minor portion of acrylonitrile and varies somewhat in its constituents from batch to batch as manufactured. The material as supplied in its filament or fiber form has a specific gravity of 1.31 at 81° F., a tenacity wet or dry of 2.5–3.5 grams per denier and a 42% to 40% elongation wet or dry. The material is soluble in acetone, cyclohexanone and dimethylformamide. It has a strain release beginning at 240° F. and a softening range between 300° to 325° F.

Polymers containing vinylidene chloride and vinyl chloride in a percent by weight of about 90% to 10% and copolymers of vinylidene chloride and acrylonitrile are also useful. Another type of useful polymer is the copolymers produced by the copolymerization of polyvinyl alcohol and butyraldehyde. This latter copolymerization produces polyacetals whose film-forming properties, when reacted under the proper conditions, are similar to those indicated for the vinyl chloride-acrylonitrile polymers. The above polymers are all copolymers but homopolymers produced by the polymerization of acrylonitrile, vinyl chloride and vinylidene chloride are also contemplated.

The above listed polymers are only indicative of the general class of polymers that may be employed. The type of polymer that is useful is necessarily limited to its water insolubility, chemical stability, and acid and alkali resistance. It is also limited by its solubility characteristics in organic solvents and its compatibility with the polyelectrolyte with which it is incorporated.

The preferred plastic film materials have a high degree of plastic flow and are generally clear to opaque in physical appearance. While they are water-insoluble, they have the ability to take up a quantity of water or polar organic solvent. This characteristic is important in the production and use of the membranes.

The preferred polyelectrolytes which impart ionic, and thus electrophilic, properties to the thin plastic films are generally water-soluble, although this property is not necessary for the purpose of the invention. A preferred feature is the provision of the same type of basic polymer structure in both the film-forming material and the polyelectrolyte, that resulting from the polymerization of vinyl-type monomers. The respective polymers are thus characterized by a high degree of compatibility which results in the formation of a uniform homogeneous membrane.

The functional groups of the electronegative polyelectrolyte may be of several types. For example, the functional or side chain groups of these polymers may be carboxylic, phosphonous, phosphonic and sulfonic. The preferred type polymer is that derived by the sulfonation of linear polystyrene. These materials preferably contain about one monosulfonic group per aromatic nucleus.

The electronegative polyelectrolytes that give most satisfactory results when employed in this invention are primarily homopolymers derived from the polymerization of one olefinic compound. For example, polystyrene sulfonic acid which is prepared by sulfonating polystyrene gives superior results. In a similar fashion polyacrylic acid gives good results, although the ionization of the carboxylic acid groups is not as strong as the ionization of the sulfonic acid groups.

Numerous useful anionic polymers are described in U.S. Patent 2,625,529, which describes synthetic water-soluble polyelectrolytes having a structure derived by the polymerization of at least one monoolefinic compound through the aliphatic unsaturated group, the structure being substantially free of cross-linking.

Of the electropositive polyelectrolytes, the preferred polymers have as their functional group a quaternary ammonium nitrogen atom. This nitrogen atom is preferably attached to the polymer by being associated or linked with an aromatic nucleus which is a side group in the linear chain. By the expression "associated with the aromatic nucleus" is meant to include nitrogen atoms which (a) are a part of the aromatic nucleus, e.g., poly N-methyl, 2-vinyl-pyridinium iodide and poly N-vinyl-imidazole methyl iodide; (b) are directly attached to the aromatic nucleus, e.g., polystyrene o- and p-trimethyl ammonium iodide; and (c) are attached to the aromatic nucleus by a divalent hydrocarbon radical, e.g., poly (vinyl benzyl trimethyl or triethyl ammonium iodide).

In addition to polymers containing a nitrogen atom associated with an aromatic nucleus, quaternized poly-N-vinyl amines and the poly-N-allyl amines may also be used. In the case of these latter compounds, care must be used in preparing the quaternary derivatives so that little, if any, cross-linking occurs.

Other polyamines of the type described above may be used, wherein the functional nitrogen atoms are in the form of primary, secondary, or tertiary amino groups converted to the salt form. Additional useful polyamines are those described in the above referred to U.S. Patent No. 2,625,529, particularly columns 5 and 7.

The polyelectrolytes that give most satisfactory results are primarily homopolymers derived from the polymerization of one olefinic compound. For example, a poly(vinyl benzyl trialkyl ammonium salt) and a poly-N-vinyl imidazole alkyl salt give superior results.

In a preferred embodiment of the invention, poly(vinyl benzyl trimethyl ammonium halide) is used, prepared for example by the chloromethylation and subsequent amination with trimethylamine of polystyrene in known manner.

In the invention, the membranes are produced by casting onto a film of a thermoplastic film-forming polymer. This polymer may generally be defined in the same manner as the film-forming polymer provided in the membranes, except that it need not have the properties required for producing the membranes in a composition with the polyelectrolyte. The initial film may be produced from a polyvinyl-type polymer derived by the addition polymerization of at least one monoolefinic compound through the unsaturated aliphatic group. It is preferably an addition polymer of the unsymmetrically substituted ethylene class, comprising polymers obtained by polymerization or copolymerization of monomers containing a

group, such as vinyl halides, vinylidene halides, vinyl esters, styrenes and acrylics. The film should have relatively low adhesion to other resins, especially, the membranes.

The initial film may be cast in a conventional manner, which presents no problem inasmuch as electrochemical properties are not involved. The film is cast from a conventional casting solution, to produce a dried film on the order of about ½ to several mils thickness. The film is dried, and thereafter, the membrane casting solution is deposited in a thin layer on the base film.

The preferred polymer for producing the initial film is polyvinyl alcohol. Other polymers which form suitable films include polyacrylonitrile and polystyrene. Medium or high viscosity substantially completely hydrolyzed polyvinyl alcohol is preferrd. The viscosity is preferably in excess of about 23 centipoises, preferably up to about 65 centipoises, in a 4% water solution at 20° C. determined by the Hoeppler falling ball method. Polyvinyl alcohol is prepared by the hydrolysis of polyvinyl acetate, and reference to substantially completely hydrolyzed means at least about 98% hydrolysis of the acetate to the alcohol.

The film may include a plasticizer, such as glycerin. Thus, a film casting solution of polyvinyl alcohol may include about 5 to 25% of glycerin, based on the weight of the polymer.

It may be advisable to include an agent which will serve to reduce the adhesion of the initial film to the support. Thus, for example, a fractional percent of a wetting agent may be included in the casting solution for the polyvinyl alcohol film. Exemplary wetting agents, employed in a proportion of about 0.1% to 0.5% by weight of the solution, are "Duponol" L–144–WDG, fatty alcohol sodium sulfate, alkyl aryl sodium sulfonates, or Triton X–100, alkyl aryl polyether alcohol from octyl phenol and ethylene oxide.

The polyvinyl alcohol is cast from a hot aqueous solution containing about 10–20% by weight or greater of the polymer. The film is dried at a convenient temperature, e.g., about 200° F. or higher.

The preferred method of producing the membranes involves providing a butyrolactone solution of the film-forming polymer and of the polyelectrolyte, and casting a film of the polymers therefrom, on the initial film. The polymer content of the solution may be any amount up to about 30% by weight of the solution, above which value the viscosity becomes excessive. The higher concentrations are preferred for commercial production, and the ability to provide a concentrated solution is very advantageous for producing the desired relatively thick membranes. For high production rates, 10–30% concentrations are required, and the preferred concentration is on the order of 20%. The higher viscosity thus produced also prevents spreading of the wet film on the casting surface and the formation of bare spots.

The proportion of the polyelectrolyte in the mixture of polymers is at least 10%, preferably up to 30%, and at times as high as 60% by weight of the polymer mixture. The proportion of the film-forming polymer is thus about 40–90%, preferably 70–90% by weight. Especially valuable membranes are produced with a minor proportion of between 15% and 30% by weight of polyelectrolyte contained therein. The casting solution preferably contains about 9–15% of the film-forming polymer and about 1–15% of the polyelectrolyte, by weight of the solution.

In the preferred practice, the polymers are dissolved in gamma-butyrolactone. It is preferred to dissolve the film-forming polymer and the polyelectrolyte separately in the lactone, and then mix the solutions.

The solution of polymers is provided in a thin layer by any suitable mechanical means, and the solvent is removed by evaporation, to produce the membrane in the form of a finely porous film. The solvent may be removed under drying conditions at any temperature up to about 400° F., the drying time being proportional to the temperature. The drying time will also vary with the thickness of the layer and of the membrane film being formed. The preferred range for drying the film is about 200° to 350° F., and the time may vary from several minutes to a number of hours.

It has been found that to produce functional membranes, the solvent content of the film should be reduced to at least about 30% by weight of the film, on a dry basis, preferably to below 20%. The lowest resistance and the highest permselectivity is obtained by substantially completely removing the solvent from the film. However, such drying requires relatively long drying time, and it is generally satisfactory to reduce the solvent content to the above values, preferably to about 5–15% in commercial operation. This may be achieved on commercial film-forming equipment by drying on the order of one-half hour at a temperature of about 250–270° F., for example. These conditions have reference to the production of films which have a dry film thickness of about 1.5–5 mils.

The membranes are at least 0.0001 inch in thickness, and they are preferably from 0.001 to 0.006 inch thick, measured in the water-hydrated form. It is an important advantage of the invention that films about 3–6 mils in thickness may readily be produced, as the mechanical properties of such films are especially useful in various applications. Thicker films may be produced, for example, up to about 25 mils. The thicker films may be formed by building up several films with intermediate drying, or a single thick film may be cast and dried for an extended period of time, at 200° F., for example.

The membranes may be cast on initial films on a number of different supports, such as glass or metal plates, for example, a polished chromium-plated drum or a stainless steel belt or plate.

After removing solvent from the cast layer, the laminated initial film-membrane is removed from the support. In casting on a stainless steel belt, the double film is nicked to separate one end from the belt, and the film is then simply pulled off the belt through rollers and formed in a roll.

The membrane is next contacted with a polar liquid. It has been found that low resistance membranes are produced by contacting first with methanol or ethanol. The membranes may also be contacted with water, preferably deionized water, but, depending upon the composition of the membrane, the resistance may be relatively high. The resistance is preferably about 100 ohms per square centimeter or below, and for certain applications, 30 ohms or less. The resistance is measured in 0.15 normal KCl.

In the production of preferred membranes according to the invention, it has been found that the electronegative membrane produced with polystyrene sulfonic acid is preferably first contacted with ethanol. The electropositive membrane produced with poly(vinyl benzyl trialkyl ammonium halide) is preferably first contacted with methanol. The contact time may vary widely, depending upon the composition of the membrane, the drying conditions, and its thickness. Thus, a period of time ranging from about thiry minutes to eighteen or more hours may be required, and this may readily be determined by determining the properties of the membranes which result from several treatment times.

The membranes are next contacted with water, preferably deionized water. The time may likewise vary, from about ten minutes to several hours.

For the initial contact of the membrane with a polar liquid, it may either be preferable to contact the membrane while still adhered to the initial film, or to first separate the initial film, such as polyvinyl alcohol, from the membrane and then contact with the polar liquid. In producing electronegative membranes with polystyrene sulfonic acid, it is preferred to contact the film-membrane with ethanol, then strip off the backing film of polyvinyl alcohol, and then immerse the membrane in deionized water. The membrane thus produced has a lower resistance than when the backing film is first stripped and the membrane is then contacted with ethanol. The ethanol softens the backing film, assisting to provide easy separation of the films.

In producing an electropositive membrane with poly (vinyl benzyl trialkyl ammonium iodide) it is preferred to first separate the initial film mechanically from the membrane, and then contact the membrane with methanol, followed by deionized water. The resistance is lower than when the film-membrane is first contacted with methanol, and the latter method also leaves dimples in the membrane.

In this manner, membranes suitable for various applications are produced. The mechanism of the formation of suitable membranes in this manner is not entirely understood. While the invention is not limited to any theory, as previously noted, it appears that the alcohol treatment swells the membrane and also removes butyrolactone therefrom. Subsequent contacting with water apparently acts to hydrate the membrane and also removes the alcohol. The membrane is then ready for use, preferably equilibrating it in the type of solution with which it is to be used. In this manner, membranes having high permselectivities, which may approach the theoretical, and low resistances, below 10 ohms per square centimeter where desired, are produced.

The following examples are illustrative of the invention, but it will be understood that the invention is not limited to the particular components, proportions, conditions and procedures described therein. Unless otherwise specified, the proportions are by weight.

*Example 1*

In casting an initial polyvinyl alcohol film on a stainless steel casting belt, a 10% solution of polyvinyl alcohol in water, to which is added 0.5% Triton X–100 wetting agent, is produced. The polyvinyl alcohol ("Elvanol" 72–51) has a viscosity of 45–55 centipoises and is 97.9–98.7% hydrolyzed. The solution is produced by adding the polyvinyl alcohol powder to deionized water with agitation, and stirring for about ten minutes. The mixture is heated to about 195° F. and agitated at this temperature until solution is complete, ordinarily about 30–60 minutes. Alternatively, polyvinyl alcohol ("Elvanol" 71–30) having a viscosity of 28–32 centipoises, and 99–100% hydrolyzed is employed. Either material may be plasticized with 5 to 25% by weight of glycerine (based on the weight of the dry film).

The hot polyvinyl alcohol solution is cast on an endless stainless steel belt. A doctor blade is adjusted to produce a dried film about 0.5 to 2 mils thick. A film about 0.5 mil thick is dried for about 15 minutes at 210° F., and the time may be increased for thicker films.

The belt provided with the polyvinyl alcohol film is then ready for casting the membrane solution thereover. This may be done in a continuous manner, by next casting the membrane solution, drying it, and removing the double film from the belt, or the belt may be completely coated with polyvinyl alcohol, followed by a formation of the membrane thereon, and then stripping the double film completely from the belt. In like manner the film-membrane may be produced on a revolving drum and separated therefrom.

*Example 2*

In like manner to Example 1, polyacrylonitrile films are cast on a stainless steel belt from a 15% solution in gamma-butyrolactone. With a six or twelve mil doctor blade setting, the films are dried for 15 minutes at 300° F., producing films 1–2 mils thick.

*Example 3*

In like manner to Example 1, polystyrene films are cast from 10% solutions in toluene. With a doctor blade setting of 8 mils, the films are dried for about 30 minutes at 260° F., producing films 1–2 mils thick.

*Example 4*

In the production of the ion exchange membranes, it is generally preferred to dissolve the film-forming polymer and the polyelectrolyte in separate portions of the butyrolactone, and then mix the solutions.

Dynel is dissolved in gamma-butyrolactone, in the proportion of 1 part by weight of Dynel to 4 parts of the lactone, at 200° F. with vigorous agitation. The solution is filtered to remove any polymer gel particles.

Polystyrene sulfonic acid, 1 part is dissolved in 4 parts of gamma-butyrolactone at 100° F., with agitation.

In manufacturing the membranes, 23 parts of the polystyrene sulfonic acid solution are mixed with 77 parts of the Dynel solution, heated to 160° F., filtered, and vacuum deaerated.

The solution is then ready for casting. For producing large quantities of the membranes, it is deposited in a layer, by passing through an elongated slot onto a film formed according to the preceding examples, which is on a revolving metal belt. The layer is then dried at 260° F. for 30 minutes, for example, and the double film is removed by peeling it off of the support, onto rollers.

The above casting solution contains 4.6% of polystyrene sulfonic acid, 15.4% of Dynel, and 80% of gamma-butyrolactone. The resulting membrane contains 23% of the polyelectrolyte and the balance Dynel, on a completely dry basis. Cation permeable membranes having other proportions, polyelectrolytes, and film-forming polymers are prepared in like manner.

The double film may then be immersed in ethanol for about 1 to 17 hours. The double film is then placed in deionized water, and the polyvinyl alcohol or other backing film is stripped from the membrane. The membrane is then allowed to stand in contact with water for about 1 to 24 hours. The membrane may be converted to the potassium salt form by treating with 2 normal KCl.

*Example 5*

Anion permeable membranes are prepared in like manner to Example 4, which contain, for example, 27.5% of poly (vinyl benzyl trimethyl ammonium iodide) and the balance Dynel, on a dry basis.

The same Dynel solution as in Example 4 may be employed. The polyelectrolyte solution is produced by dissolving 1 part of the electrolyte in 4 parts of gamma-butyrolactone, and heating to 120° F. with agitation.

In production of the membranes, 27.5 parts of the electrolyte solution are mixed with 72.5 parts of the Dynel solution, heated, filtered, and vacuum deaerated as in Example 4. The casting solution contains 5.5% of the polyelectrolyte, 14.5% of Dynel, and 80% of gamma-butyrolactone.

The membranes are then produced in the same manner, pouring a layer of sufficient thickness on the initial film to produce the membrane thickness desired, preferably employing a doctor blade suitably adjusted for the desired thickness. Anion permeable membranes having other proportions, polyelectrolytes, and film-forming polymers are prepared in like manner.

After removing the double film from the belt, the polyvinyl alcohol film or other backing film is mechanically stripped from the membrane. The membrane is immersed in methanol for about 1 to 17 hours. The film is then immersed in deionized water for about 1 to 24 hours.

Example 6

Cation permeable membranes were cast on a polyvinyl alcohol film precast on a stainless steel belt, as described in Example 1. One film contained 20% of polystyrene sulfonic acid and was cast from a solution of 4% of the polyelectrolyte, 16% of Dynel, and 80% of gamma-butyrolactone. The membrane was dried at 250° F. for 21 minutes. The thickness of the film thus produced, containing 21.2% of the solvent, was 3.2 mils. The resistance of the membrane in 0.15 normal KCl was 14 ohms per square centimeter, after contacting with ethanol, separating the membrane from the polyvinyl alcohol film, and contacting with water as described in Example 4. The thickness of the resulting hydrated film was 4.1 mils.

In the same manner, membranes containing 30% of polystyrene sulfonic acid were cast from a solution containing 6% of the polyelectrolyte, 14% of Dynel, and 80% of the lactone, and the membrane was dried to 24.6% solvent. After contacting with ethanol and water, the resistance was 10 ohms per square centimeter, and the thickness was 5.4 mils.

Membranes containing 23% of polystyrene sulfonic acid were cast from a solution containing 4.6% of the polyelectrolyte, 15.4% of Dynel, and 80% of gamma-butyrolactone. The membranes were dried for 30 minutes at 260° F. The thickness of the film thus dried to 10.5% solvent was 3.0 mils. After contacting with ethanol for 18 hours, separating the membrane from the backing film, and contacting with deionized water for 24 hours, the resistance was 12 ohms per square centimeter. The permselectivities of the membranes were good.

Example 7

Anion permeable membranes were prepared by casting a solution on a film of polyvinyl alcohol precast on a stainless steel belt, as described in Example 1. A membrane containing 25% of poly (vinyl benzyl trimethyl ammonium iodide) and the balance of Dynel was cast from a solution containing 5% of the polyelectrolyte, 15% of Dynel, and 80% of gamma-butyrolactone. The membrane was dried for 30 minutes at 260° F. Membranes were produced in this manner which varied in thickness from 1.9–3.9 mils.

When the membranes were first separated from the polyvinyl alcohol film and then contacted with methanol followed by deionized water as described in Example 5, the resistances varied from 44 to 47 ohms per square centimeter and the permselectivities were good. The resistances were slightly higher when the polyvinyl alcohol film was not first separated before contact with methanol. The resistances varied from 74 to 190 ohms when the separated membrane was contacted first with ethanol and then with deionized water.

Membranes containing 27.5% of the above polyelectrolyte were cast and dried in the same manner as described above, from a solution containing 5.5% of the electrolyte, 14.5% of Dynel, and 80% of gamma-butyrolactone. The thickness of the film containing 15% residual solvent was 3.0 mils. After separating the membrane from the backing film and contacting with methanol and deionized water as described in Example 5, the resistance was 25 ohms per square centimeter and the permselectivity was good.

Example 8

In like manner to Example 6, membranes containing 20% of polystyrene sulfonic acid were cast on polyvinyl alcohol films, from a solution containing 4% of the polyelectrolyte, 16% of Dynel, and 80% of gamma-butyrolactone, and were dried and contacted with ethanol followed by water.

When the membranes were dried at 225° F. for 22 minutes, the residual solvent content varied from 14.7 to 20.3%, in films 1.7–4.4 mils thick. The corresponding resistances varied from 17 to 62 ohms per square centimeter.

When the membranes were dried at 275° F. for 22 minutes, to residual solvent contents varying from 8.3 to 10.1%, the resistances varied from 38 to 55 ohms for films which were 2.2 to 3.2 mils thick as dried.

Example 9

In the preferred method of producing an anion permeable membrane, poly (vinyl benzyl trimethyl ammonium iodide) is employed as the polyelectrolyte. Since this polymer is most conveniently produced in the chloride form, it is necessary to convert it to the iodide form.

The chloride form of the polyelectrolyte is dissolved in methanol at about 20% concentration. The solution is then passed through a strongly basic anion exchange resin in the hydroxide form. This converts the polyelectrolyte to the hydroxide, and a solution of the hydroxide is obtained.

Any strongly basic anion exchange resin in finely divided solid form may be employed. For example, the ion exchange resin may be produced from a copolymer of about 2–4% divinyl benzene and the balance styrene. The copolymer is chloromethylated and thereafter reacted with aqueous trimethylamine in known manner, to produce a strongly basic quaternary ammonium anion exchange resin in the chloride form. The resin may be converted to the hydroxide form by treating with sodium hydroxide solution, to exchange the chloride ions for hydroxyl ions.

The methanolic solution of the polyelectrolyte in the hydroxide form, as produced by contacting with the anion exchange resin is diluted with isopropanol and is then precipitated with hyroidodic acid in at least the stoichiometric amount required to convert the polyelectrolyte to the iodide, preferably employing a slight excess of the acid. The mixture is preferably 25% to 50% methanol and the balance isopropanol. The precipitate of the polyelectrolyte in the iodide form is then separated, washed with isopropanol, and dried.

The preferred cation permeable membrane contains about 23% of polystyrene sulfonic acid and about 77% Dynel, and it is preferably formed from a solution of 20% of the polymers and 80% of gamma-butyrolactone. The preferred anion permeable membrane contains 27.5% of poly (vinyl benzyl trimethyl ammonium iodide), and 72.5% Dynel. It is likewise cast from a solution containing 20% of the polymers and 80% of gamma-butyrolactone.

The molecular weight of the polystyrene sulfonic acid may be, for example, from 5,000 to 140,000. Preferably, it is 50,000 to 140,000 for low resistances. The molecular weight of the poly (vinyl benzyl trimethyl ammonium iodide) may be, for example, about 5,000 to 200,000.

The invention thus provides a new and improved method of producing cation and anion permeable membranes, which is especially suited for rapid large-scale production. The method provides a solution to the problem of casting the membranes so that they are readily removed and treated, and the membranes have good mechanical strength and good electrochemical properties.

The invention is hereby claimed as follows:

1. The method of producing an ion selective permeable membrane which comprises casting an aqueous solution of polyvinylalcohol on a metal surface in a thin layer, removing solvent from said layer by evaporation to produce a polyvinylalcohol film, casting an organic solvent solution of a mixture 40% to 90% by weight of an acrylonitrile-vinyl chloride copolymer and 10% to 60% by weight of a linear polyelectrolyte on said film in a thin layer, removing solvent from said layer by evaporation to produce the membrane on said film, removing the resulting laminated film and membrane as a unit from said metal surface, and separating the membrane from the film.

2. The method of producing an ion selective permeable membrane which comprises casting an aqueous solution of polyvinylalcohol containing a wetting agent on a metal surface in a thin layer, removing solvent from said layer by evaporation to produce a polyvinylalcohol film, casting an organic solvent solution of a mixture 40% to 90% by weight of an acrylonitrile-vinyl chloride copolymer and 10% to 60% by weight of a linear polyelectrolyte on said film in a thin layer, removing solvent from said layer by evaporation to produce the membrane on said film, removing the resulting laminated film and membrane as a unit from said metal surface, and separating the membrane from the film.

3. The method of producing an ion selective permeable membrane which comprises casting an aqueous solution of polyvinylalcohol on a metal surface in a thin layer, removing solvent from said layer by evaporation to produce a polyvinylalcohol film, casting an organic solvent solution of a mixture 40% to 90% by weight of an acrylonitrile-vinyl chloride copolymer and 10% to 60% by weight of a linear polyelectrolyte on said film in a thin layer, removing solvent from said layer by evaporation to produce the membrane on said film, removing the resulting laminated film and membrane as a unit from said metal surface, and contacting the membrane with a member of the group consisting of methanol and ethanol and separating the membrane from the film.

4. The method of producing an ion selective permeable membrane which comprises casting a solvent solution of a thermoplastic film-forming polymer containing no ion exchange groups on a metal surface in a thin layer, removing solvent from said layer to produce a film of said polymer, casting a homogeneous molecular dispersion in a solvent of 40% to 90% by weight of a water insoluble acid and alkali resistant thermoplastic film-forming polymer and 10% to 60% by weight of a linear polyelectrolyte on said film in a thin layer, removing solvent from said layer to produce a membrane on said film, removing the resulting laminated film and membrane as a unit from said metal surface, and separating said membrane from said film.

5. A method as claimed in claim 4 in which said film which is formed on said metal surface is a polymer derived by the addition polymerization of at least one monoolefinic compound through the unsaturated aliphatic group.

References Cited in the file of this patent

UNITED STATES PATENTS

| | | |
|---|---|---|
| 1,981,472 | Schneider | Nov. 20, 1934 |
| 2,198,621 | Izard | Apr. 30, 1940 |
| 2,321,638 | Williams | June 15, 1943 |
| 2,558,244 | Gibbons | June 26, 1951 |
| 2,648,099 | Dunmire | Aug. 11, 1953 |
| 2,704,735 | Hedges et al. | Mar. 22, 1955 |
| 2,730,768 | Clarke | Jan. 17, 1956 |
| 2,764,469 | Kowolik et al. | Sept. 25, 1956 |
| 2,780,604 | Clarke et al. | Feb. 5, 1957 |